US011976785B2

(12) United States Patent
Lane et al.

(10) Patent No.: US 11,976,785 B2
(45) Date of Patent: May 7, 2024

(54) EXPANDABLE DEVICE FOR A PORTABLE ELECTRONIC DEVICE

(71) Applicant: PopSockets LLC, Boulder, CO (US)

(72) Inventors: Robert Lane, Boulder, CO (US); Angela Sevilla, Boulder, CO (US)

(73) Assignee: POPSOCKETS LLC, Boulder, CO (US)

( * ) Notice: Subject to any disclaimer, the term of this patent is extended or adjusted under 35 U.S.C. 154(b) by 712 days.

(21) Appl. No.: 17/137,896

(22) PCT Filed: Jun. 20, 2019

(86) PCT No.: PCT/US2019/038259
§ 371 (c)(1),
(2) Date: Dec. 30, 2020

(87) PCT Pub. No.: WO2020/009807
PCT Pub. Date: Jan. 9, 2020

(65) Prior Publication Data
US 2021/0348716 A1    Nov. 11, 2021

Related U.S. Application Data

(60) Provisional application No. 62/694,706, filed on Jul. 6, 2018.

(51) Int. Cl.
*F16M 13/04*    (2006.01)
*F16M 11/38*    (2006.01)

(52) U.S. Cl.
CPC .............. *F16M 13/04* (2013.01); *F16M 11/38* (2013.01); *F16M 2200/063* (2013.01)

(58) Field of Classification Search
CPC ...... F16M 13/04; F16M 11/38; F16M 11/048; F16M 11/2092; F16M 2200/063
See application file for complete search history.

(56) References Cited

U.S. PATENT DOCUMENTS

| | | |
|---|---|---|
| 5,752,834 A | 5/1998 | Ling |
| 2005/0277092 A1* | 12/2005 | Hwang ................. G09B 19/16 |
| | | 434/58 |

(Continued)

FOREIGN PATENT DOCUMENTS

WO    2017044622 A1    3/2017

OTHER PUBLICATIONS

Transmittal of the International Search Report and Written Opinion issued in PCT/US2019/038259 dated Jan. 9, 2020.

*Primary Examiner* — Stephen A Vu
(74) *Attorney, Agent, or Firm* — Irell & Manella LLP (57) ABSTRACT

An expandable device includes a base having a top side and a bottom side, first and second coupling portions disposed on the top side of the base, a linkage mechanism, and a button. The linkage mechanism is movably coupled to the first coupling portion and the second coupling portion. The button has a top side and a bottom side and is operably coupled to the linkage mechanism. The linkage mechanism is rotatable between a first configuration where the button is disposed in a first, collapsed configuration adjacent to the base and a second configuration where the button is disposed in a second, expanded configuration spaced away from the base.

17 Claims, 5 Drawing Sheets

(56) References Cited

U.S. PATENT DOCUMENTS

| | | | |
|---|---|---|---|
| 2013/0039015 A1* | 2/2013 | Li | F16M 13/022 361/728 |
| 2015/0354747 A1* | 12/2015 | Jennings | F16M 11/18 74/99 R |
| 2018/0051851 A1 | 2/2018 | Hobbs et al. | |
| 2018/0335178 A1* | 11/2018 | Bin | F16M 11/38 |

* cited by examiner

EXPANDABLE DEVICE FOR A PORTABLE ELECTRONIC DEVICE

CROSS-REFERENCE TO RELATED APPLICATION

This application is a National Stage of International Application No. PCT/US19/38259, filed Jun. 20, 2019, which claims the benefit of U.S. Provisional Patent Application No. 62/694,706, filed Jul. 6, 2018, the entire contents of which are hereby incorporated by reference.

FIELD OF THE DISCLOSURE

The present disclosure generally relates to an expandable device and, more particularly, to expandable devices that can be attached to a portable electronic device or a case for a portable electronic device and used as grips, stands, or for other purposes.

BACKGROUND

Portable electronic devices, such as MP3 players and smart phones, are often housed in protective covers or cases in order to protect the device from damage, provide a grip for handling the device, and/or provide a stand for propping the device on a surface. Such cases increase the effective size of the device. Expandable devices and accessories, which may be attached directly to the device or to the case protecting the device, are used for a variety of functions, including propping the device on a surface and providing an expandable grip for handling the device. The expandable devices have decorative buttons, which may display logos, decals, symbols, or other artistic renderings.

SUMMARY

In accordance with one aspect, an expandable device includes a base having a top side and a bottom side, first and second coupling portions disposed on the top side of the base, a linkage mechanism, and a button. The linkage mechanism is movably coupled to the first coupling portion and the second coupling portion. The button has a top side and a bottom side and is operably coupled to the linkage mechanism. The linkage mechanism is rotatable between a first configuration where the button is disposed in a first, collapsed configuration adjacent to the base and a second configuration where the button is disposed in a second, expanded configuration spaced away from the base.

In some approaches, the first coupling portion may be in the form of a slotted protrusion having a first end and a second end. The slotted protrusion may have an opening extending between the first and second ends. The second coupling portion may be in the form of a protrusion having an opening.

In some examples, the linkage mechanism may include a first elongated member having a first end and a second end. The first end of the first elongated member may be pivotably coupled to the first coupling portion, and the second end of the first elongated member may be pivotably coupled to the button. In some approaches, the first end of the first elongated member may be slidably and pivotably coupled to the first coupling portion. The linkage mechanism may also include a second elongated member having a first end and a second end. The first end of the second elongated member may be pivotably coupled to the second coupling portion, and the second end of the second elongated member may be pivotably coupled to the button. The first end of the second elongated member may be slidably and pivotably coupled to the second coupling portion.

In other examples, the second ends of the first and second members include a hooked portion, and the bottom side of the button includes an opening to accommodate the hooked portions of the second ends of the first and second members.

The linkage mechanism may be nested in a region adjacent to the first coupling portion and the second coupling portion when the linkage mechanism is disposed in the first configuration. In some approaches, the expandable device may include three linkages. In other approaches, the expandable device may include four linkages. The expandable device may further include a biasing device that urges the button towards the second configuration.

In accordance with another aspect, an approach for operating an expandable device for a portable electronic device includes moving a linkage mechanism of the expandable device about pivot connections disposed on a base of the expandable device from a collapsed configuration to an expanded configuration. In this expanded configuration, the linkage mechanism projects upwardly from the base. The approach further includes moving the linkage mechanism about the pivot connections from the expanded configuration to the collapsed configuration. In this collapsed configuration, the linkage mechanism generally extends along the base.

BRIEF DESCRIPTION OF THE DRAWINGS

The above needs are at least partially met through provision of the expandable device for a portable electronic device described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, expandable devices for portable electronic devices are provided that include a base and a linkage mechanism that is movable relative to the base between a collapsed configuration and an expanded configuration. The linkage mechanism is movable in a number of directions (e.g., about a pivot portion that pivotably couples to the base) to allow for movement between collapsed states and expanded states projecting upwardly from the base. The expandable devices may further include a button coupled to the body.

A first embodiment of an expandable device 100 is shown in FIGS. 1-7. The expandable device 100 includes a base 102, a linkage mechanism 120 operably coupled to the base 102, and a button 140. The base 102 has a top or upper side 102a and a bottom or lower side 102b. The bottom side 102b of the base 102 is attachable to a portable electronic device (not shown), a case for a portable electronic device, or other desired component.

The expandable device 100 further includes a first coupling portion 104 and a second coupling portion 110, both of which are disposed on the top side 102a of the base 102. In some approaches, the first and/or the second coupling portions 104, 110 are integrally formed with the base 102, and in other examples, the first and/or the second coupling portions 104, 110 are coupled to the base 102 via any number of suitable approaches such as, for example, an adhesive, ultrasonic welding, a snap or friction fit, and the like.

Figure 4:
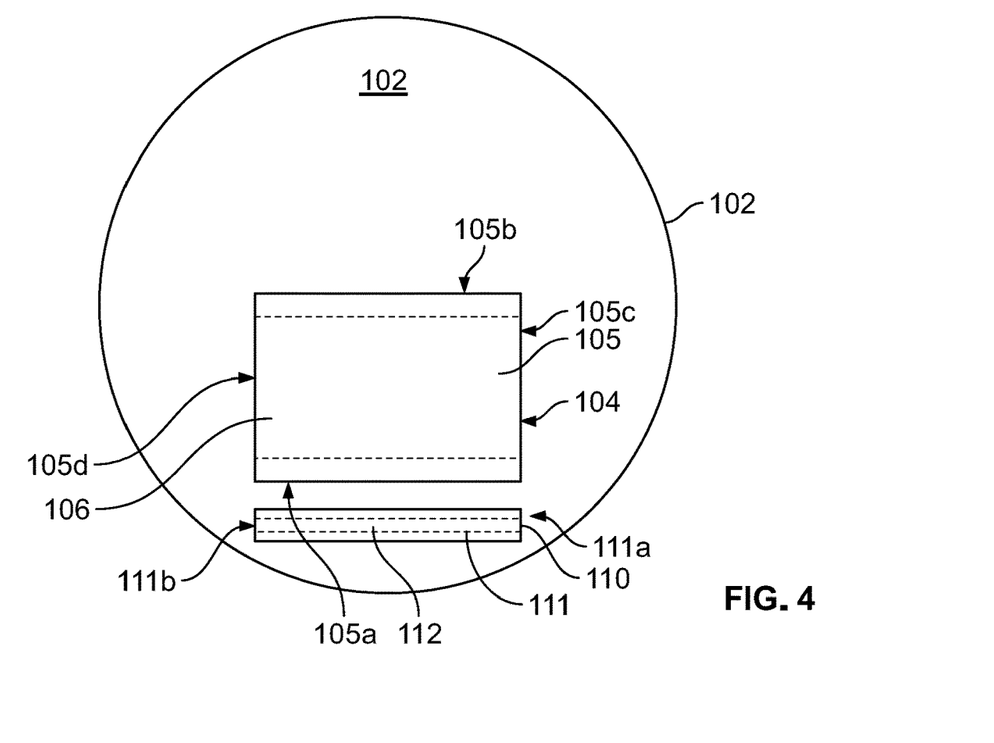
FIG. 4 illustrates a top plan view of an example base member of the expandable device of FIGS. 1-3 in accordance with various embodiments.

The first coupling portion 104 is in the form of a first, slotted protrusion 104 that extends upwardly from the base 102. The slotted protrusion 104 defines a body 105 having a first end 105a, a second end 105b, a first side 105c and a second side 105d, and further defines a channel 106 extending at least partially through the first and second sides 105c, 105d between the first end 105a and the second end 105b. The second coupling portion 110 is in the form of a second protrusion 110 that extends upwardly from the base 102. The second protrusion 110 defines a body 111 having a first side 111a and a second side 111b, and further defines an opening 112 that extends between the first side 111a and the second side 111b. The first and second coupling portions 104, 110 may take any number of other configurations.

Figure 5:
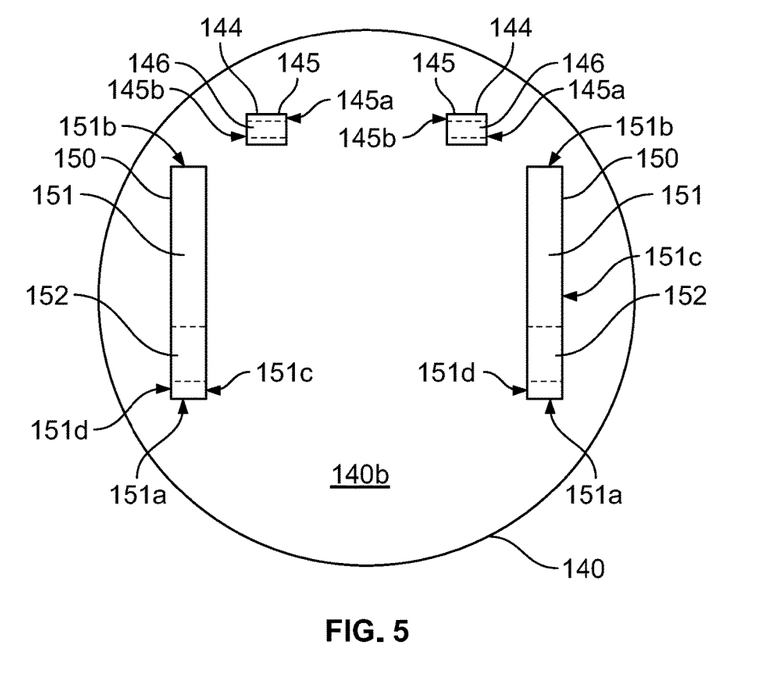
FIG. 5 illustrates a bottom plan view of an example button of the expandable device of FIGS. 1-4 in accordance with various embodiments.
Figure 6:
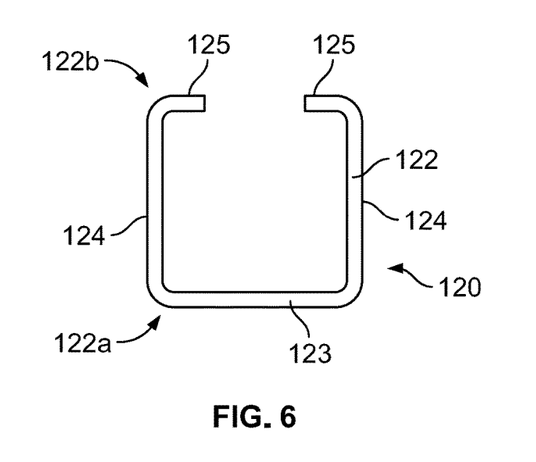
FIG. 6 illustrates a front elevation view of an example first elongated member of the expandable device of FIGS. 1-5 in accordance with various embodiments.
Figure 7:
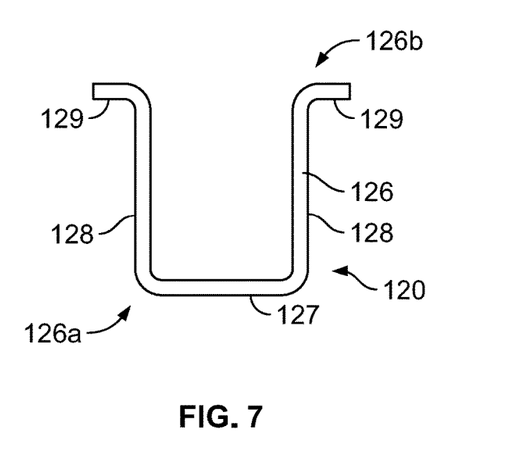
FIG. 7 illustrates a front elevation view of an example second elongated member of the expandable device of FIGS. 1-6 in accordance with various embodiments.
Figure 8:
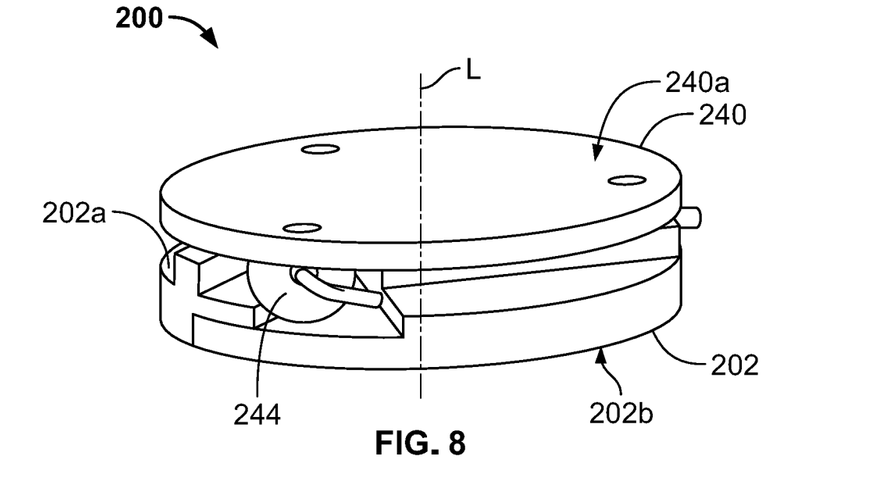
FIG. 8 illustrates a perspective view of a second example expandable device in accordance with various embodiments.

The linkage mechanism 120 is operably coupled to the base 102 via any number of suitable approaches. In the illustrated embodiment of FIGS. 1-5, the linkage mechanism 120 is in the form of a first elongated member 122 and a second elongated member 126. As shown in FIG. 6, the first elongated member 122 is a generally U-shaped member having a first end 122a and a second end 122b defined by a body 123, legs 124, and inwardly-extending protrusions 125. As shown in FIG. 7, the second elongated member 126 is also a generally U-shaped member and has a first end 126a and a second end 126b defined by a body 127, legs 128, and outwardly-extending protrusions 129. While the illustrated elongated members 122, 126 are single units, in some examples, the first and second elongated members 122, 126 may be partitioned into two distinct components that are separated at their respective body portions 123, 127.

The button 140 includes a top or upper side 140a and a bottom or inner side 140b and is operably coupled to the linkage mechanism 120 (as will be discussed in further detail below). The button 140 may be removable from the expandable device 100. The button 140 may have artistic value (e.g., the button 150 may include an artistic rendering, a logo, a symbol, text, or a decal), the button 140 may provide a grip that allows a user to slide their fingers between the bottom side 140b and the body 102 when the linkage mechanism 120 is in the expanded configuration such that the top side 140a of the button 140 is disposed adjacent to the palm of the user's hand, and may also provide a space in which a cord, such as a cord for earphones, may be wrapped and stored around a portion of the body 102. As such, in some examples, it may be desirable to remove the button 140 and replace it with another button 140 that features a different aesthetic design and/or provides a different grip so as to change the look and/or function of the expandable device 100.

The expandable device 100 further includes third coupling portions 144 and fourth coupling portions 150, both of which are disposed on the bottom side 140b of the button 140. In some approaches, the third and/or the fourth coupling portions 144, 150 are integrally formed with the button 140, and in other examples, the third and/or the fourth coupling portions 144, 150 are coupled to the button 140 via any number of suitable approaches such as, for example, an adhesive, ultrasonic welding, a snap or friction fit, and the like.

As illustrated in FIG. 5, the third coupling portions 144 are in the form of third protrusions 144 that extend downwardly from the button 140. The third protrusions 144 define bodies 145 having a first side 145a and a second side 145b, and further define an opening 146 that extends between the first side 145a and the second side 145b. The fourth coupling portions 150 are in the form of fourth slotted protrusions 150 that extend downwardly from the button 140. The slotted protrusions 150 define a body 151 having a first end 151a, a second end 151b, a first side 151c and a second side 151d, and further defines a channel 152 extending at least partially through the first and second sides 151c, 151d between the first end 151a and the second end 151b. The third and fourth coupling portions 144, 150 may take any number of other configurations.

The first elongated member 122 is operably coupled to the first protrusion 104 and the third protrusions 144. In some examples, the first end 122a of the first elongated member 122 is coupled to the first protrusion 104, and the second end 122*b* of the first elongated member 122 is coupled to the third protrusions 144. Specifically, the body 123 of the first elongated member 122 is disposed in the channel 106, and thus the legs 124 of the first elongated member 122 are disposed adjacent to the first and second sides 105*c*, 105*d*. Further, the inwardly-extending protrusions 125 of the first elongated member 122 may be inserted into the opening 146 of the third protrusions 144.

The second elongated member 126 is operably coupled to the second protrusion 110 and the fourth protrusions 150. In some examples, the first end 126*a* of the second elongated member 126 is coupled to the second protrusion 110, and the second end 126*b* of the second elongated member 126 is coupled to the fourth protrusions 150. Specifically, the body 127 of the second elongated member 126 is disposed in the opening 112, and the legs 128 of the second elongated member 126 are disposed adjacent to the first and second sides 111*a*, 111*b*. Further, the outwardly-extending protrusions 129 of the second elongated member 126 may be inserted into the channels 152 of the fourth protrusions 150.

The first elongated member 122 is rotatable and/or pivotable within the channel 106 of the first protrusion 104 and further may slide between the first end 105*a* and the second end 105*b* thereof. Further, the first elongated member 122 is rotatable and/or pivotable within the opening 146 of the third protrusions 144. The second elongated member 126 is rotatable and/or pivotable within the opening 112 of the second protrusion 110. Further, the second elongated member 126 is rotatable and/or pivotable within the channel 152 of the fourth protrusions 150 and further may slide between the first end 151*a* and the second end 151*b* thereof.

Figure 1:
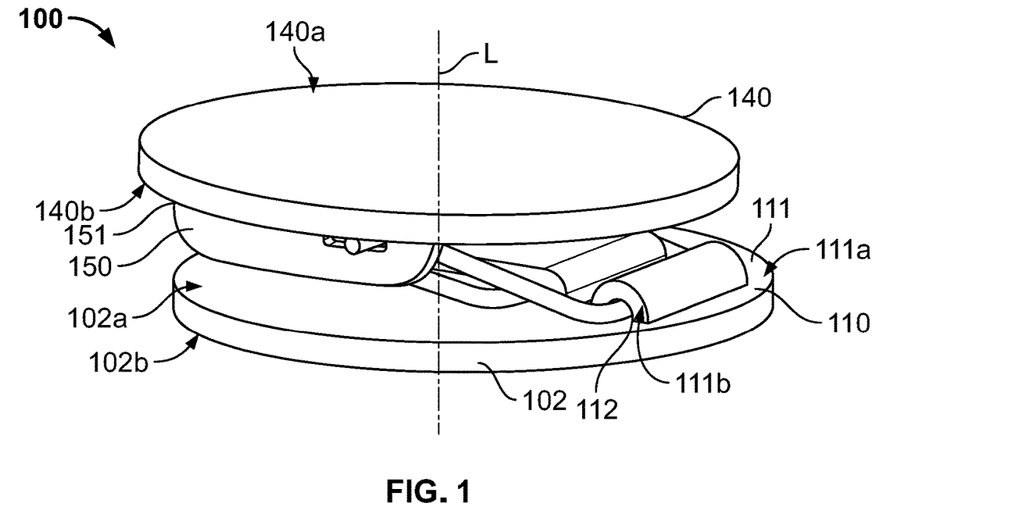
FIG. 1 illustrates a perspective view of a first example expandable device in accordance with various embodiments.

In operation, the expandable device 100 may be positioned in an expanded configuration (FIGS. 2 and 3) or a collapsed configuration (FIG. 1) by manipulating the button 140. Generally, the user of the expandable device 100 may move the expandable device 100 from the collapsed configuration (FIG. 1) to the expanded configuration (FIGS. 2 and 3) by, for example, grabbing or grasping the button 140 and moving (e.g., pulling) the button 140 upward, away from the base 102, along the longitudinal axis L. Conversely, the user of the expandable device 100 may move the expandable device 100 from the expanded configuration to the collapsed configuration by, for example, grabbing or grasping the button 140 and pushing the button 140 downward, toward the base 102. In either of these movements, the first and second elongated members 122, 126 will pivot and/or slide in their respective openings and channels 106, 112, 146, 152 disposed on the base 102 and the button 140. As illustrated in FIG. 1, the legs 124 of the first elongated member 122 may at least partially surround the first and second sides 105*c*, 105*d* of the first coupling portion 104. The first elongated member 122 may be dimensioned such that the legs 124 frictionally engage the first and second sides 105*c*, 105*d* of the first coupling portion, thereby retaining the expandable device 100 in the collapsed configuration until a user overcomes this frictional force by urging the button 140 towards the expanded configuration. In the collapsed configuration, the legs 128 of the second elongated member 126 may be positioned on top of the legs 124 of the first elongated member 122.

Figure 2:
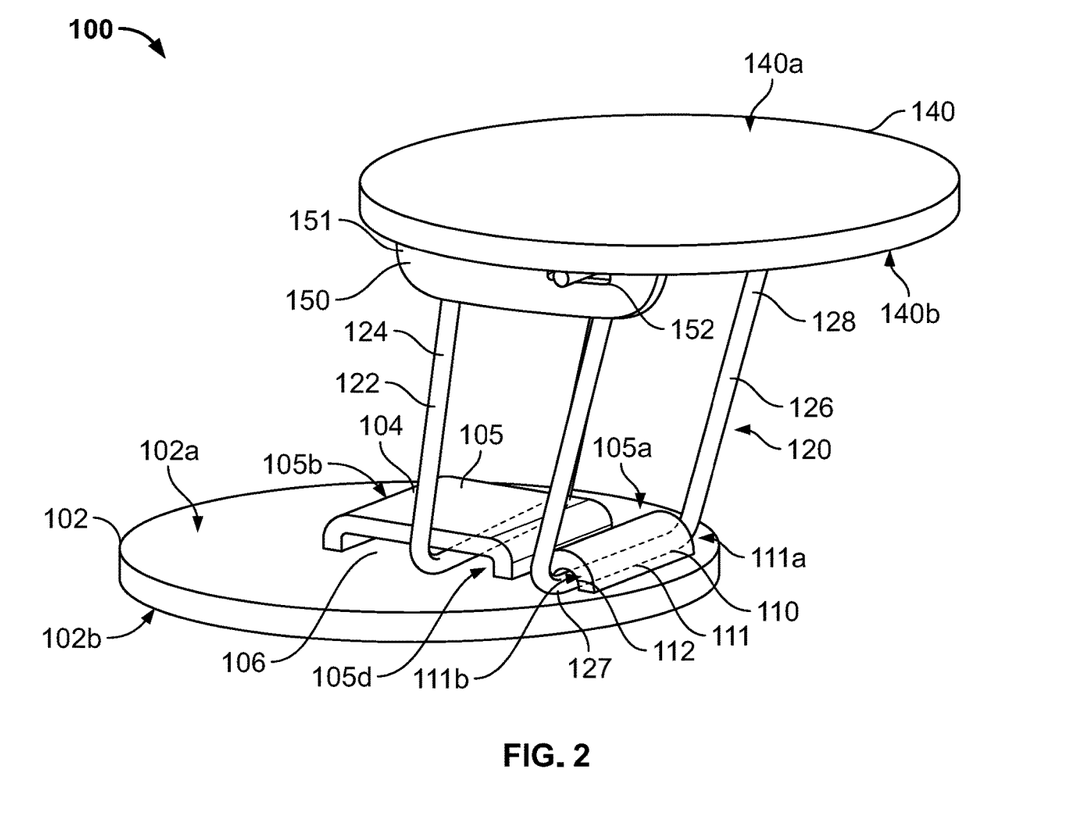
FIG. 2 illustrates a perspective view of the expandable device of FIG. 1 in a first expanded configuration in accordance with various embodiments.
Figure 3:
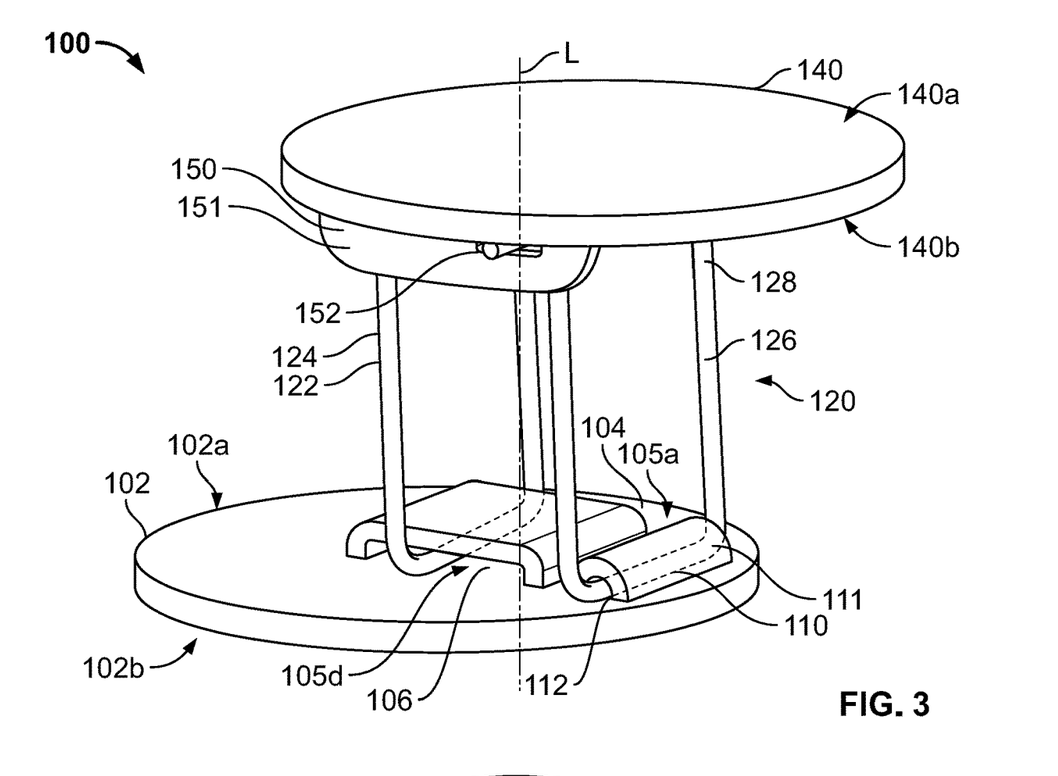
FIG. 3 illustrates a perspective view of the expandable device of FIGS. 1 and 2 in a second expanded configuration in accordance with various embodiments.

As illustrated in FIGS. 2 and 3, the expandable device 100 may be positioned in any number of expanded configurations. Any number of the interfaces between the first and second elongated members 122, 126 and the openings and/or channels 106, 112, 146, 152 may be friction-fit. For example, the legs 124 may frictionally engage the first and/or second sides 105*c*, 105*d* of the first protrusion 104 and/or the first and/or second sides 145*a*, 145*b* of the third protrusion 144. Further, the legs 128 may frictionally engage the first and/or second sides 111*a*, 111*b* of the second protrusion 110 and/or the first and/or second sides 151*c*, 151*d* of the fourth protrusion 150. As a result, upon positioning the button 140 in a desired configuration, it may be retained in that configuration until a sufficiently-large force overcomes the frictional force between these components. Other examples of frictional arrangements are possible.

While the illustrated embodiment of FIGS. 1-7 depict the linkage mechanism 120 pivoting counter-clockwise when transitioning the expandable device 100 to the collapsed configuration, the linkage mechanism 120 may alternatively pivot clockwise when transitioning to the collapsed configuration.

A second embodiment of an expandable device 200 is shown in FIGS. 8-12. It will be appreciated that the expandable device 200 illustrated in FIGS. 8-12 may include similar features to the expandable device 100, and thereby elements illustrated in FIGS. 8-11 are designated by similar reference numbers indicated on the embodiment illustrated in FIGS. 1-7, increased by 100. Accordingly, these features will not be described in substantial detail.

Figures 10, 11, 12:
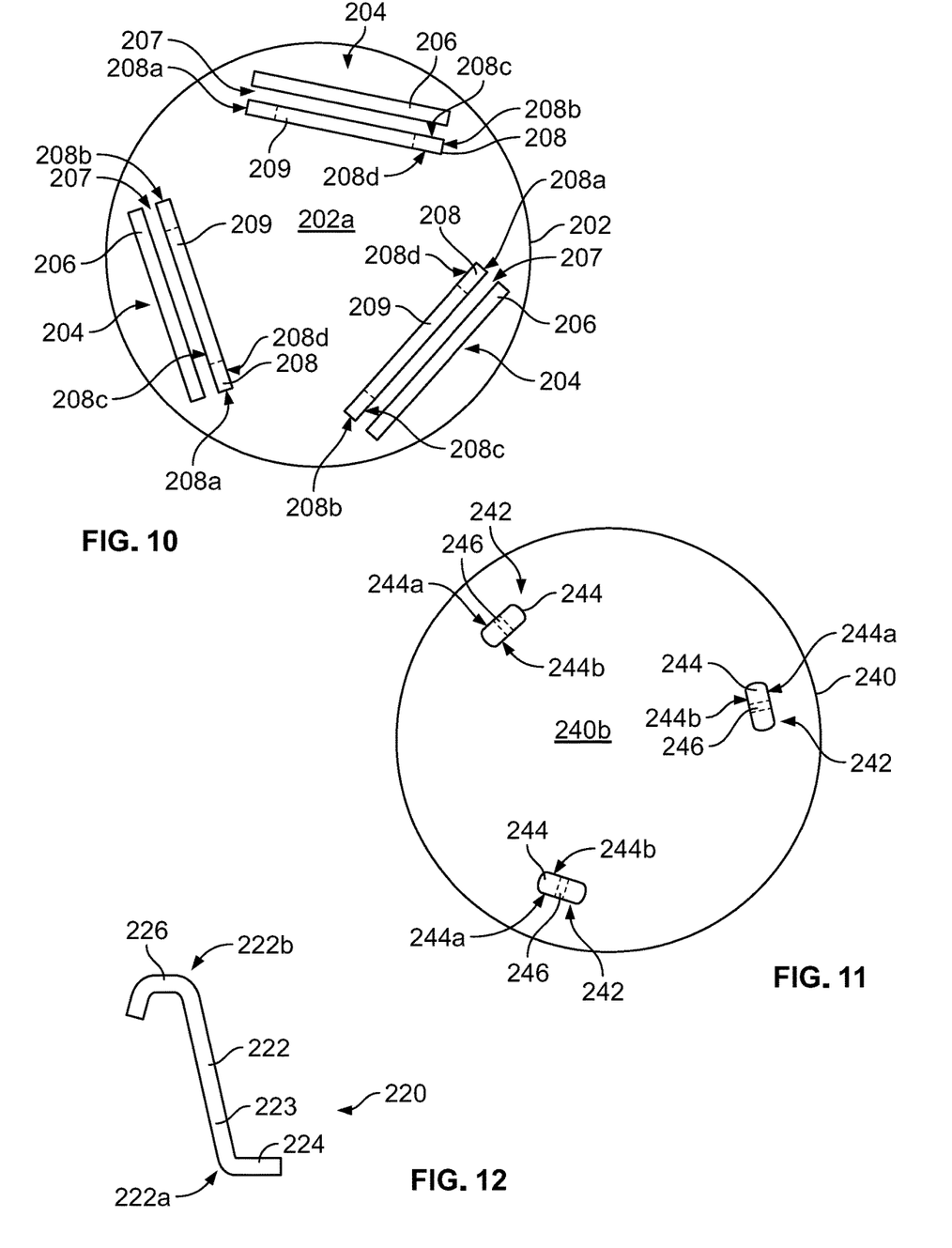
FIG. 10 illustrates a top plan view of an example base member of the expandable device of FIGS. 8 and 9 in accordance with various embodiments.
FIG. 11 illustrates a bottom plan view of an example button of the expandable device of FIGS. 8-10 in accordance with various embodiments.
FIG. 12 illustrates a front elevation view of an example elongated member of the expandable device of FIGS. 8-11 in accordance with various embodiments.

In this embodiment, the linkage mechanism 220 is in the form of three generally identical elongated members 222. As shown in FIG. 12, the elongated members 222 are generally snake-shaped members having a first end 222*a* and a second end 222*b* defined by a body 223, an extension 224, and a hooked portion 226. Other examples and configurations are possible.

Figure 9:
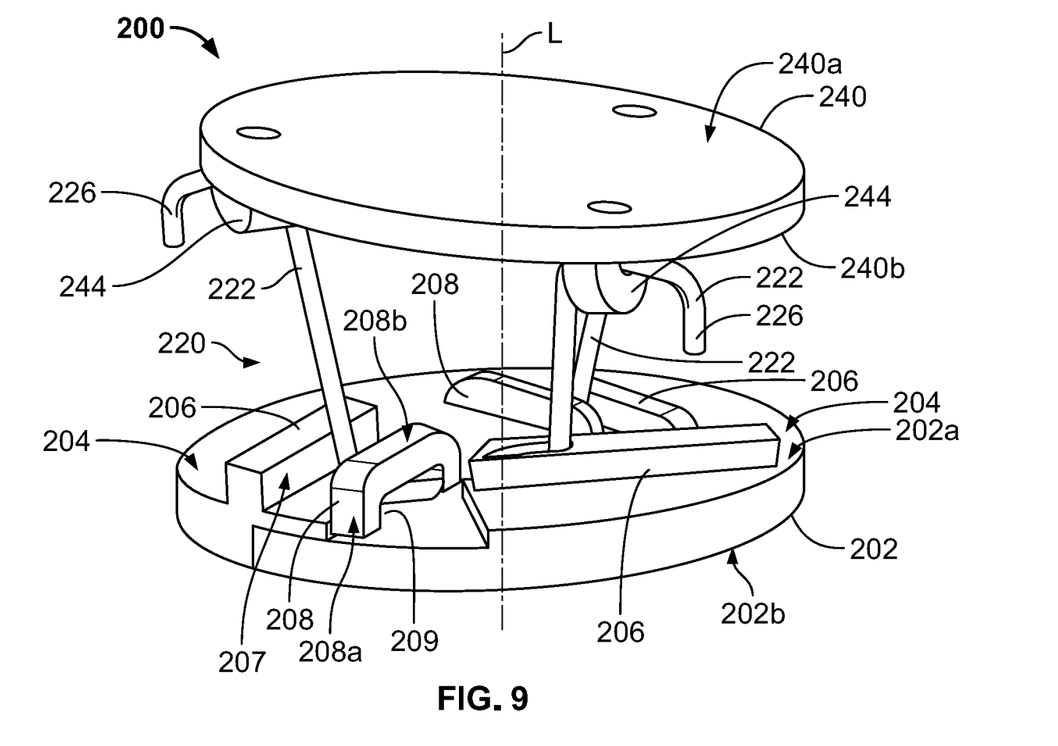
FIG. 9 illustrates a perspective view of the expandable device of FIG. 8 in an expanded configuration in accordance with various embodiments.

In the expandable device 200, the base 202 accommodates three coupling portions 204 in the form of channeled-and-slotted protrusions. Specifically, each coupling portion 204 includes a first elongated protrusion 206 positioned adjacent to a second elongated protrusion 208. An area between the first and second elongated protrusions 206, 208 defines a channel 207. Further, as illustrated in FIGS. 9 and 10, the second elongated protrusion 208 defines a first end 208*a*, a second end 208*b*, a first side 208*c*, a second side 208*d*, and a slot 209 extending at least partially through the first and second sides 208*c*, 208*d* between the first end 208*a* and the second end 208*b*. The coupling portions 204 may be integrally formed with the base 202 and/or may be attached thereto using any number of suitable approaches.

The button 240 accommodates three coupling portions 242 in the form of protrusions extending from the bottom side 240*b* thereof. Specifically, each coupling portion 242 defines a third protrusion 244 having a first side 244*a* and a second side 244*b*, and further defines an opening 246 that extends between the first side 244*a* and the second side 244*b*. The coupling portions 242 may be integrally formed with the button 240 and/or may be attached thereto using any number of suitable approaches.

Each of the elongated members 222 are operably coupled to respective coupling portions 204 and 242. In some examples, the first ends 222*a* of the elongated members 222 are coupled to the coupling portions 204, and the second ends 222*b* of the elongated members 222 are coupled to the coupling portions 242. Specifically, a portion of the body 223 of the elongated member 222 is disposed in the channel 207, and the extension 224 is rotatably (and/or pivotably) and slidably disposed in the slot 209 of the second elongated protrusion 208. Further, the hooked portion 226 may be rotatably inserted into the opening 246 of the third protrusion 244.

The elongated member 222 is rotatable and/or pivotable within the slot 209 of the second elongated protrusion 208 and further may slide between the first end 208a and the second end 208b thereof. Further, the elongated member 222 is rotatable and/or pivotable within the opening 246 of the third protrusion 244.

In operation, the expandable device 200 may be positioned in an expanded configuration (FIG. 9) or a collapsed configuration (FIG. 8) by manipulating the button 240. Generally, the user of the expandable device 200 may move the expandable device 200 from the collapsed configuration (FIG. 8) to the expanded configuration (FIG. 9) by, for example, grabbing or grasping the button 240 and moving (e.g., pulling) the button 240 upward, away from the base 202, along the longitudinal axis L. Conversely, the user of the expandable device 200 may move the expandable device 200 from the expanded configuration to the collapsed configuration by, for example, grabbing or grasping the button 240 and pushing the button 240 downward, toward the base 202. In either of these movements, the elongated members 222 will pivot and/or slide in their respective slots and openings 209, 246 disposed on the base 202 and the button 240. As a result, the button 240 will rotate in a clockwise (as illustrated) or counter-clockwise (not shown) direction and the body 223 of the elongated members 222 will be disposed within the channels 207. Further, the third protrusions 244 will be positioned in a void region 203 between adjacent coupling portions 204 on the base 202.

Each of the first and second elongated protrusions 206, 208 may be dimensioned and/or positioned to closely surround the bodies 223 of the elongated members 222. The first and second elongated protrusions 206, 208 may frictionally engage the bodies 223 of the elongated members 222, thereby retaining the expandable device 200 in the collapsed configuration until a user overcomes this frictional force by urging the button 240 towards the expanded configuration. When in the expanded configuration, a portion of the bodies 223 of the elongated members 222 may still be frictionally engaged with the first and second protrusions 206, 208, and thus the expandable device 200 may be retained in the expanded configuration until a user overcomes this frictional force by urging the button 240 towards the collapsed configuration.

While the illustrated embodiment of FIGS. 8-12 depict the linkage mechanism 220 and the base 240 rotating clockwise when transitioning the expandable device 200 to the collapsed configuration, the linkage mechanism 220 and the base 240 may alternatively rotate counter-clockwise when transitioning to the collapsed configuration.

In some forms, the expandable devices 100, 200 may include any number of elongated members 122, 222. Further, a biasing device (e.g., a resilient member; not shown) may be disposed between the base 102, 202 and the button 140, 240 to urge the button 140, 240 towards the expanded configuration. In these examples, the expandable devices 100, 200 may include any number of suitable locking mechanisms (e.g., a frictional coupling, a tab-and catch coupling, etc.) that retains the expandable devices 100, 200 in the collapsed configuration until the locking mechanism is disengaged.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An expandable device for attachment to a portable electronic device, the expandable device comprising:
    a base having a top side and a bottom side, the bottom side adapted to engage a portion of the portable electronic device or a case for the portable electronic device;
    a first coupling portion disposed on the top side of the base;
    a second coupling portion disposed on the top side of the base;
    a linkage mechanism movably coupled to the first coupling portion and the second coupling portion; and
    a button having a top side and a bottom side, the button being operably coupled to the linkage mechanism;
    wherein the linkage mechanism is rotatable between a first configuration whereby the button is disposed in a collapsed configuration adjacent to the base, and a second configuration whereby the button is disposed in an expanded configuration spaced away from the base,
    wherein the second coupling portion comprises a protrusion defining an opening.

2. The expandable device of claim 1, wherein the linkage mechanism comprises a first elongated member having a first end and a second end, wherein the first end of the first elongated member is pivotably coupled to the first coupling portion, and wherein the second end of the first elongated member is pivotably coupled to the button.

3. The expandable device of claim 2, wherein the first end of the first elongated member is slidably and pivotably coupled to the first coupling portion.

4. The expandable device of claim 2,
    wherein the linkage mechanism comprises a second elongated member having a first end and a second end, wherein the first end of the second elongated member is rotatably coupled to the second coupling portion, and wherein the second end of the second elongated member is rotatably coupled to the button, and
    wherein the second ends of the first and second members each include a hooked portion, and the bottom side of the button comprises an opening to accommodate the hooked portions of the second ends of the first and second members.

5. The expandable device of claim 1, wherein the linkage mechanism comprises a second elongated member having a first end and a second end, wherein the first end of the second elongated member is rotatably coupled to the second coupling portion, and wherein the second end of the second elongated member is rotatably coupled to the button.

6. The expandable device of claim 5, wherein the first end of the second elongated member is slidably and pivotably coupled to the second coupling portion.

7. The expandable device of claim 1, wherein the linkage mechanism is adapted to be nested in a region adjacent to the first coupling portion and the second coupling portion when the linkage mechanism is disposed in the first configuration.

8. The expandable device of claim 1, wherein the linkage mechanism comprises three linkages.

9. The expandable device of claim 1, wherein the linkage mechanism comprises four linkages.

10. The expandable device of claim 1, further comprising a biasing device adapted to urge the button towards the second configuration.

11. The expandable device of claim 1, wherein the first coupling portion comprises a slotted protrusion having an opening extending between a first end and a second end.

12. An expandable device for attachment to a portable electronic device, the expandable device comprising:
    a base having a top side and a bottom side, the bottom side adapted to engage a portion of the portable electronic device or a case for the portable electronic device;

a first coupling portion disposed on the top side of the base;

a second coupling portion disposed on the top side of the base;

a linkage mechanism movably coupled to the first coupling portion and the second coupling portion; and a button having a top side and a bottom side, the button being operably coupled to the linkage mechanism;

wherein the linkage mechanism is rotatable between a first configuration whereby the button is disposed in a collapsed configuration adjacent to the base, and a second configuration whereby the button is disposed in an expanded configuration spaced away from the base, wherein the first coupling portion comprises a slotted protrusion having an opening extending between a first end and a second end.

13. The expandable device of claim 12, wherein the linkage mechanism comprises a first elongated member having a first end and a second end, wherein the first end of the first elongated member is pivotably coupled to the first coupling portion, and wherein the second end of the first elongated member is pivotably coupled to the button.

14. The expandable device of claim 12, wherein the first end of the first elongated member is slidably and pivotably coupled to the first coupling portion.

15. A method of operating an expandable device for a portable electronic device, the method comprising:

moving a linkage mechanism of the expandable device about pivot connections disposed on a base of the expandable device from a collapsed configuration to an expanded configuration whereby the linkage mechanism projects upwardly from the base; and moving the linkage mechanism about the pivot connections from the expanded configuration to the collapsed configuration whereby the linkage mechanism generally extends along the base, wherein moving the linkage mechanism comprises pivoting the linkage mechanism along a protrusion having an opening.

16. The method of claim 15, wherein moving the linkage mechanism comprises pivoting the linkage mechanism along a slotted protrusion having an opening extending between a first end and a second end.

17. The method of claim 15, further comprising biasing the linkage mechanism to the expanded states with a biasing mechanism.

* * * * *